(12) United States Patent
Vinod et al.

(10) Patent No.: US 11,409,564 B2
(45) Date of Patent: Aug. 9, 2022

(54) RESOURCE ALLOCATION FOR TUNING HYPERPARAMETERS OF LARGE-SCALE DEEP LEARNING WORKLOADS

(71) Applicant: INTERNATIONAL BUSINESS MACHINES CORPORATION, Armonk, NY (US)

(72) Inventors: Saritha Vinod, Bangalore (IN); Anto Ajay Raj John, Bangalore (IN); Asis Kumar Patra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/945,037

(22) Filed: Jul. 31, 2020

(65) Prior Publication Data
US 2022/0035672 A1 Feb. 3, 2022

(51) Int. Cl.
*G06F 9/50* (2006.01)
*G06T 1/20* (2006.01)

(52) U.S. Cl.
CPC ............ *G06F 9/5016* (2013.01); *G06F 9/505* (2013.01); *G06T 1/20* (2013.01); *G06F 2209/505* (2013.01)

(58) Field of Classification Search
CPC .. G06F 9/5016; G06F 9/505; G06F 2209/505; G06T 1/20
See application file for complete search history.

(56) References Cited

U.S. PATENT DOCUMENTS

| 2016/0224903 A1 | 8/2016 | Talathi |
| 2018/0240041 A1 | 8/2018 | Koch |
| 2019/0095819 A1 | 3/2019 | Varadarajan |

(Continued)

FOREIGN PATENT DOCUMENTS

| CN | 105744006 A | 7/2016 |
| CN | 110462636 A | 11/2019 |

(Continued)

OTHER PUBLICATIONS

Huang et al. "SwapAdvisor: Push Deep Learning Beyond the GPU Memory Limit via Smart Swapping", Mar. 20, 2020 (Year: 2020).*

(Continued)

*Primary Examiner* — Sisley N Kim
(74) *Attorney, Agent, or Firm* — Caleb D. Wilkes

(57) ABSTRACT

A method, computer system, and a computer program product may perform hyperparameter tuning. Hyperparameter search input data may be received. A search algorithm to generate a set of hyperparameters may be invoked. A hyperparameter tuning resource allocator may receive physical resource data regarding a cluster. The hyperparameter tuning resource allocator may determine a required workload and may use a received number of parallel experiments to determine the required workload. The hyperparameter tuning resource allocator may determine whether an option to mandate the workload batch size was selected. The cluster may perform the number of parallel experiments to search and tune the set of hyperparameters. The hyperparameter tuning resource allocator may manage the cluster according to the physical resource data and the required workload and by using tensor swapping.

20 Claims, 9 Drawing Sheets

(56) References Cited

U.S. PATENT DOCUMENTS

| | | |
|---|---|---|
| 2019/0122141 A1 | 4/2019 | Zhen |
| 2019/0236487 A1 | 8/2019 | Huang |
| 2019/0392353 A1 | 12/2019 | Liu |
| 2020/0042362 A1* | 2/2020 | Cui .................. G06F 9/5027 |
| 2020/0097847 A1* | 3/2020 | Convertino ......... G06F 11/3447 |
| 2020/0167691 A1 | 5/2020 | Golovin |
| 2021/0019634 A1* | 1/2021 | Pudipeddi .............. G06N 3/082 |

FOREIGN PATENT DOCUMENTS

| | | |
|---|---|---|
| KR | 20190048895 A | 5/2019 |
| KR | 20190118937 A | 10/2019 |

OTHER PUBLICATIONS

International Search Report and Written Opinion of the International Searching Authority, Application No. PCT/CN2021/108944, dated Nov. 2, 2021, 9 pages.

Mell et al., "The NIST Definition of Cloud Computing", National Institute of Standards and Technology, Special Publication 800-145, Sep. 2011, 7 pages.

Prasanna, "Kubernetes For AI Hyperparameter Search Experiments," Nvidiadeveloper blog, Dec. 14, 2018, https://devblogs.nvidia.com/kubernetes-ai-hyperparameter-search-experiments/, 14 pages.

Rhu et al., "vDNN: Virtualized Deep Neural Networks for Scalable, Memory-Efficient Neural Network Design," IEEE, 2016, https://ieeexplore.ieee.org/document/7783721, 13 pages.

\* cited by examiner

RESOURCE ALLOCATION FOR TUNING HYPERPARAMETERS OF LARGE-SCALE DEEP LEARNING WORKLOADS

BACKGROUND

The present invention relates generally to the field of computing, and more particularly to deep learning.

Deep learning as a technology has helped solve many problems which were previously considered difficult to solve. The newer techniques of deep learning also necessitate the availability of larger datasets over which learning can happen. The larger datasets that are needed translate in this field into a usage of a large number of accelerators on a single server or on multiple servers. The accuracy of deep learning problems is sensitive to the hyperparameters that are used to tune the model. If hyperparameters for a larger deep learning problem have to be tuned, then a computing cluster needs to be available for the tuning.

SUMMARY

According to one exemplary embodiment, a method, a computer system, and a computer program product may perform hyperparameter tuning. Hyperparameter search input data may be received that includes a number of parallel experiments and an option to mandate a workload batch size for a hyperparameter search. A search algorithm to generate a set of hyperparameters may be invoked. A hyperparameter tuning resource allocator may receive physical resource data regarding a cluster. The hyperparameter tuning resource allocator may determine a required workload. The hyperparameter tuning resource allocator may use the received number of parallel experiments to determine the required workload. The hyperparameter tuning resource allocator may determine whether the option to mandate the workload batch size was selected. The cluster may perform the number of parallel experiments so that the set of hyperparameters is searched and so that the set of hyperparameters is tuned. The hyperparameter tuning resource allocator may manage the cluster, during the performing, according to the physical resource data and the required workload and by using tensor swapping.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for hyperparameter tuning. The present embodiments have the capacity to improve the technical field of deep learning by allowing the utilization of limited computing resources to search hyperparameters for large scale deep-learning workloads. Thereby, the need to have or access large-scale accelerator clusters is avoided.

Specifically, data scientists and researchers generally do not have access to large clusters of accelerators, e.g., large clusters of graphic processing units (GPUs). Most deep-learning experimentation is carried out in a shared cloud environment. In the shared cloud environment, large clusters of accelerators are either not available or are cost-prohibitive for many data scientists and researchers.

Therefore, it may be advantageous to, among other things, provide a way to allow data scientists and researchers, e.g., from academia, to perform hyperparameter search on a cloud environment using the usual accelerator cluster resources available to them, so that the hyperparameter search may be performed in an economically feasible manner.

The following described exemplary embodiments allow limited computing resources to search and tune hyperparameters for large scale deep-learning workloads and also allow data scientists and researchers, e.g., from academia, to perform hyperparameter search and tuning on a cloud environment in an economically feasible manner. The exemplary embodiments allow infrastructure costs related to acquiring or accessing large-scale accelerator clusters to be avoided.

The exemplary embodiments allow improved resource management and achieve dynamic adjustment of accelerator usage according to hyperparameter search job requirements. The exemplary embodiments will allow organizations to reduce resources that are required for hyperparameter search and tuning in a model development phase, so that large-scale accelerator clusters can be dedicated for production workloads.

Figure 1:
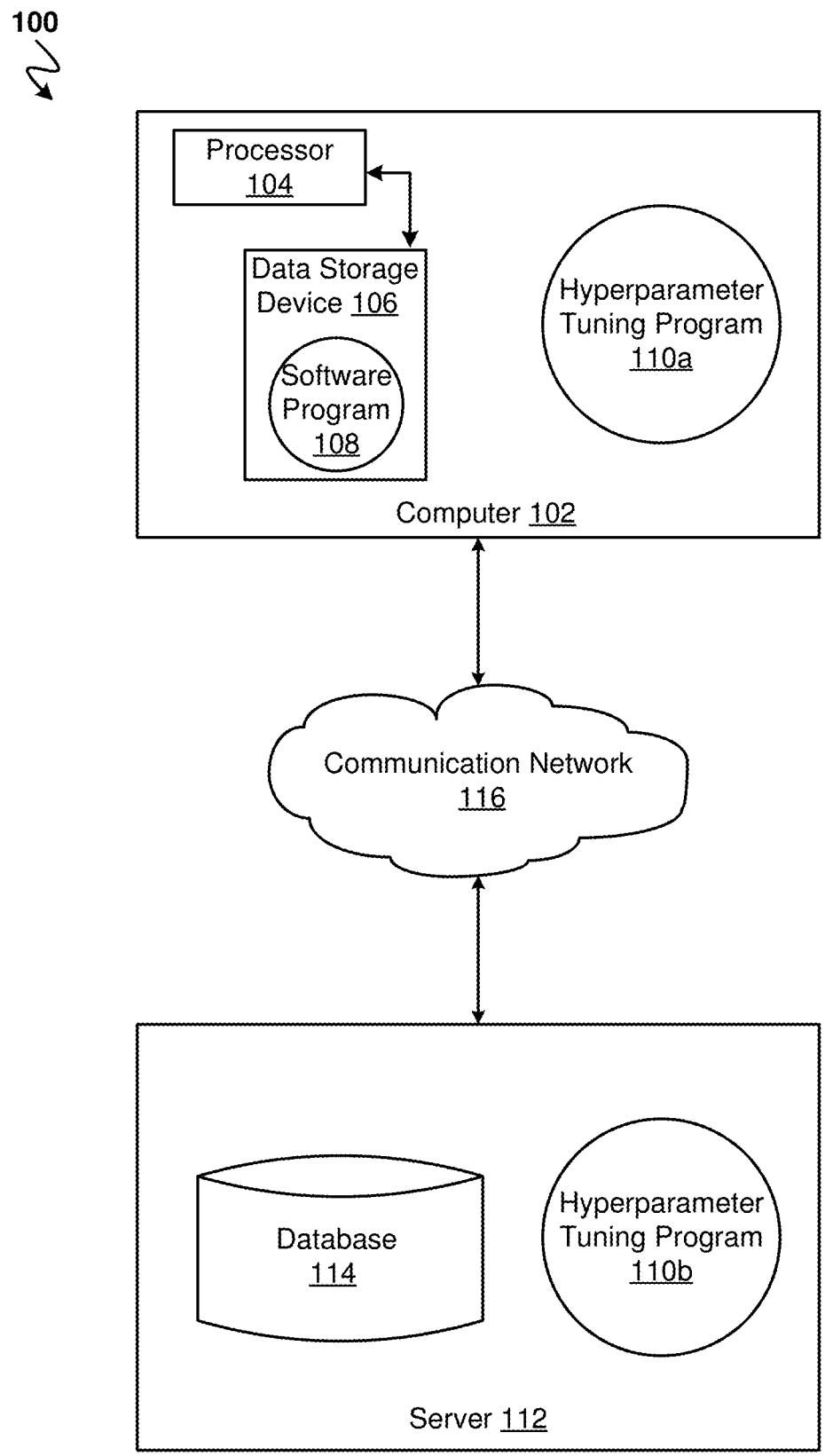
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a hyperparameter tuning program 110a. The networked computer environment 100 may also include a server 112 that is enabled to run a hyperparameter tuning program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

Figure 4:
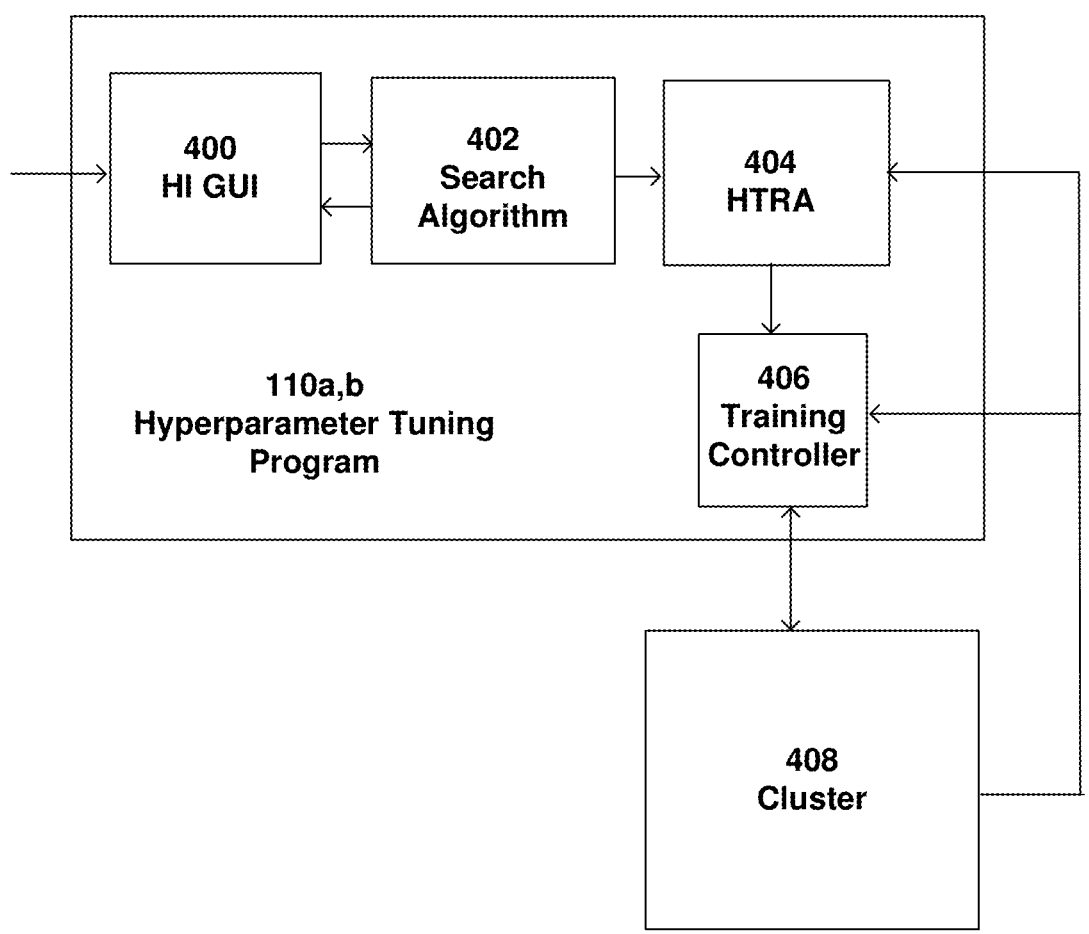
FIG. 4 shows an example of a hyperparameter tuning program and its interaction with a cluster.
Figure 5:
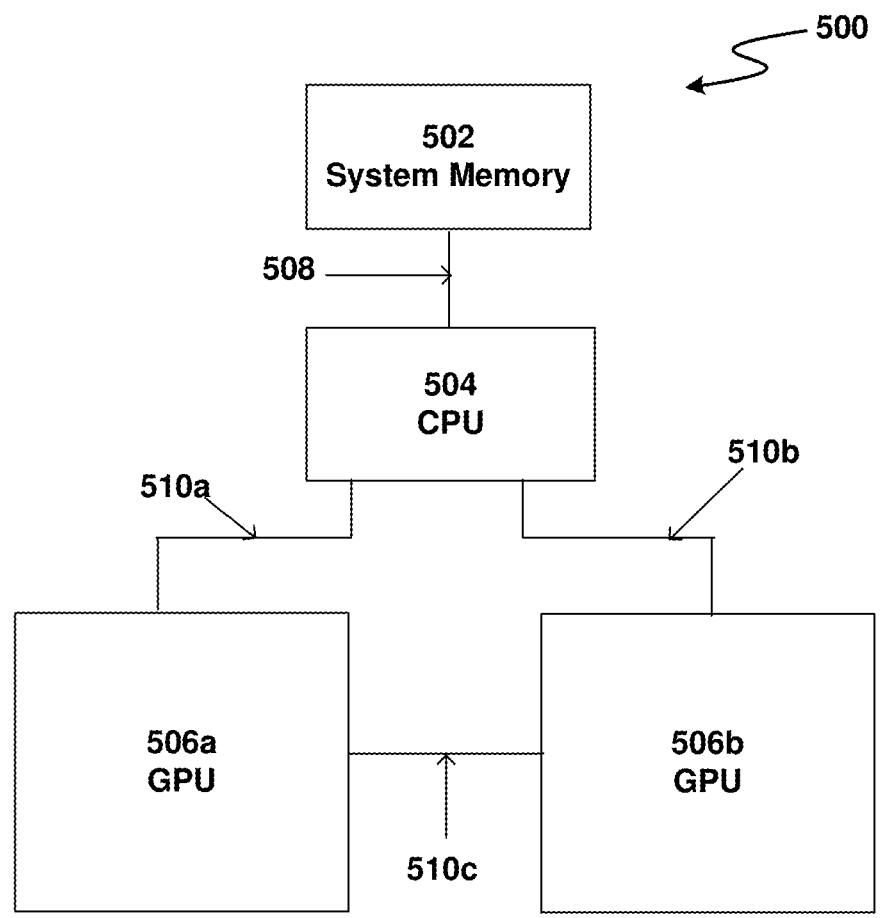
FIG. 5 shows an example of a computing node that may be used in the hyperparameter tuning process.
Figure 6:
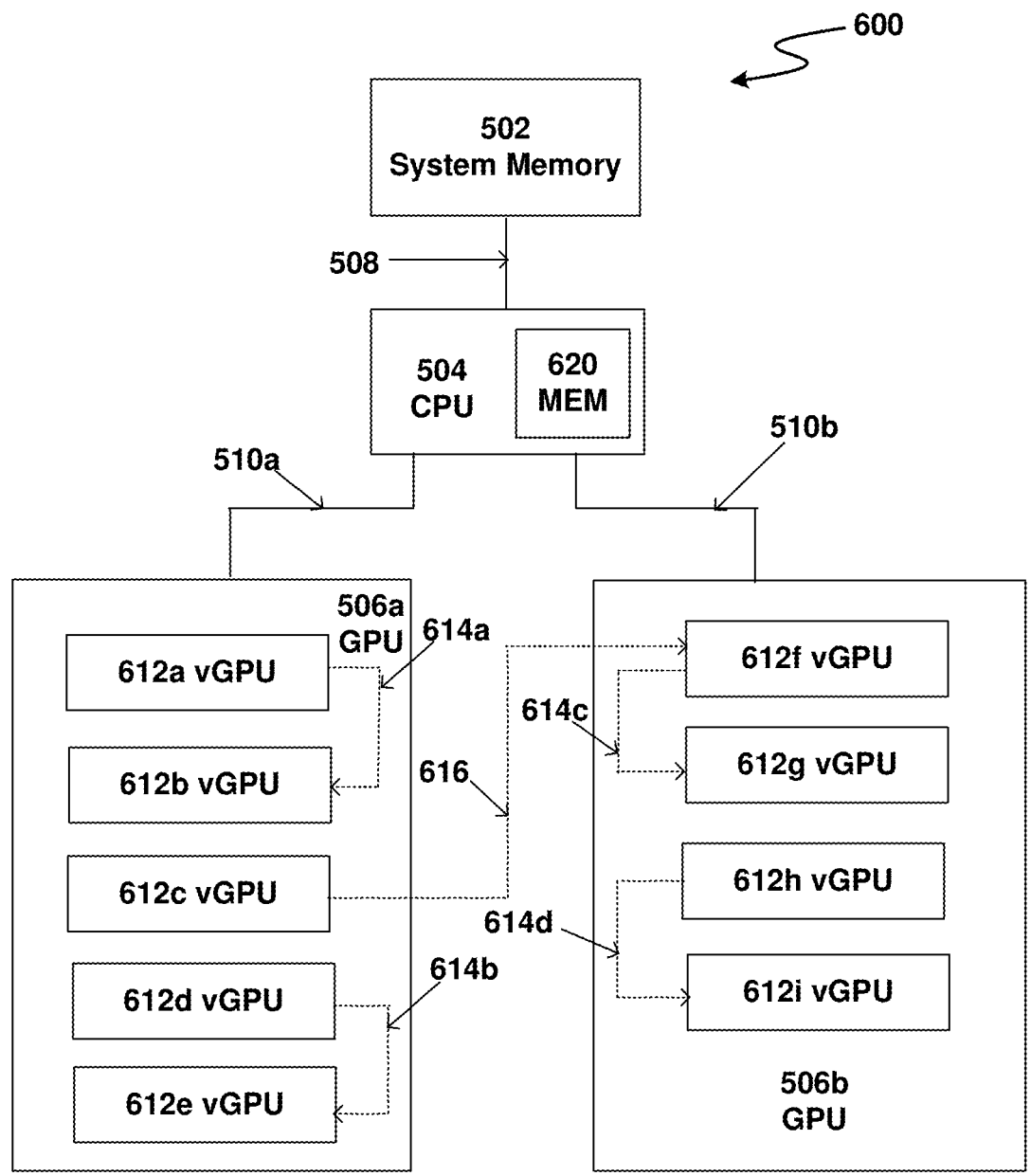
FIG. 6 shows an example of a computing node with virtual accelerators that may be used in the hyperparameter tuning process.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the hyperparameter tuning program 110a, 110b may interact with a database 114 that may be embedded in various storage devices, such as, but not limited to a computer/mobile device 102, a networked server 112, or a cloud storage service. According to various implementations of the present embodiment, the hyperparameter tuning program 110a, 110b may interact with a cluster as shown in FIG. 4. The cluster may include a computing node 500 as shown in FIG. 5 and/or a computing node 600 with virtual accelerators as shown in FIG. 6.

According to the present embodiment, a user using a client computer 102 or a server computer 112 may use the hyperparameter tuning program 110a, 110b (respectively) to perform hyperparameter tuning for hyperparameters of a deep learning process. The hyperparameter tuning method is explained in more detail below with respect to FIGS. 2-9. As also explained in more detail below and as is particularly shown in FIG. 4, the hyperparameter tuning program 110a, 110b may include a job input generator, a search algorithm, a hyperparameter tuning resource allocator, and a training controller. Some or all of the job input generator, the search algorithm, the hyperparameter tuning resource allocator, and the training controller may be provided in the form of software. The hyperparameter tuning program 110a, 110b may work in conjunction with a cluster.

Figure 2:
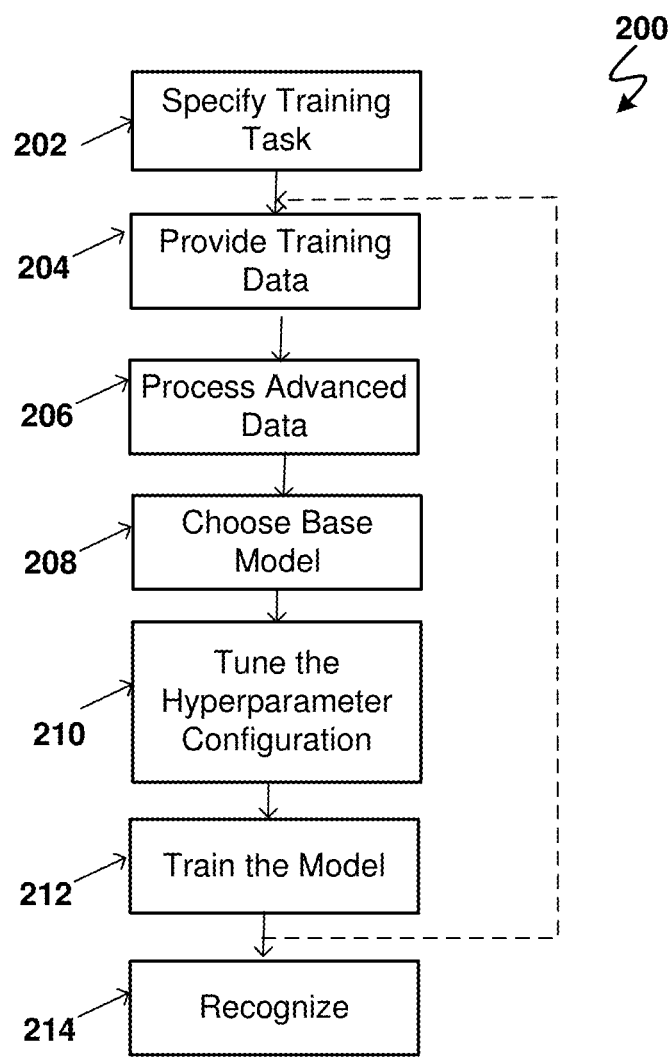
FIG. 2 is an operational flowchart illustrating an end-to-end process for a deep learning workflow according to at least one embodiment.

Referring now to FIG. 2, an operational flowchart illustrating an exemplary end-to-end deep-learning workflow process 200 in which the hyperparameter tuning program 110a and 110b will take actions is depicted according to at least one embodiment.

A deep learning model development phase may include sub-phases of processing advanced data, choosing a model, and tuning hyperparameters. Developers or researchers involved in this development phase generally use a cloud infrastructure where resources are limited. Large-scale dedicated clusters are usually available only in production environments. Provisioning of resources on the cloud may include data scientists, developers, and/or DevOps utilizing a resource allocator and orchestrator to perform this development phase, with the resource allocator and orchestrator working with a centralized infrastructure located on the cloud.

As depicted in FIG. 2, an end-to-end deep-learning workflow process 200 may include steps to train a model and to ultimately recognize patterns or data that are submitted. A training task may be specified in step 202. This step 202 may be performed, for example, by identifying a specific business problem, acquiring subject matter expertise, defining a unit of analysis and a prediction target, prioritizing model criteria, considering risks and success criteria, and/or identifying a desired scope of the search. A training task may be to develop a model which may receive pictures of animals as input and which may recognize and correctly identify the type of animal in the various pictures. Another training task may be to develop a model which may receive audio sounds or recordings as input and which may perform speech-to-text conversion and which may recognize physical or age characteristics about a speaker based on the voice of the speaker. Another training task may be to use image classification to identify defects in products at various stages of a production line.

Training data may be provided in step 204. For example, training data may be uploaded. The training data may be raw data that is acquired from data sources. Advanced data may be processed in step 206. This processing of advanced data may also be referred to as pre-processing of data. For example, this processing may handle missing data, outliers, or data with long tails. Data with long tails may be remedied by filtering the raw data. Data may be merged in this step 206. Following the example given above for image classification in a production line, the training data may include photos of defective products and photos of products without any defects. This step 206 may alternatively or additionally include data enrichment, data standardization, and data format conversion to create compatibility with training algorithms.

A base model may be chosen in step 208 from various candidate models that have been previously used and that have been successful for recognition. Hyperparameters or a hyperparameter configuration may be tuned in step 210. An exemplary process of sub-steps to perform step 210 is described below in FIG. 3 as a hyperparameter tuning process. A model may be trained in step 212. This training may be done with a training data set and may generate model artifacts. The model training of step 212 is performed with a consistent set of hyperparameters that were tuned in step 210, e.g., the hyperparameters are not changed during the step 212. After the model is trained, the deep-learning model or neural network may then be ready to perform inference or may be ready to, in step 214, recognize patterns or data. For example, corresponding to the possible embodiments mentioned above the trained model may then be able to identify the type of animal shown in a picture, may be able to perform text conversion or natural language processing from received audio signals, or may be able to recognize characteristics about the person speaking. The trained deep-learning model may be ran on a test dataset to produce inferences. The trained deep-learning model may be able to recognize whether a picture shows a cat, a dog, an elephant, or a camel, etc. The steps of end-to-end deep-learning workflow process 200 may be repeated or performed iteratively, as shown by the return arrow passing from after the model training step 212 back to earlier in the process, so that steps, e.g., steps 204 to 212, may be performed again.

The end-to-end deep-learning workflow process 200 may use an iterative hyperparameter search and tuning phase. The hyperparameter tuning may require multiple training runs to experiment with different set of hyperparameters that are searched. Therefore, in a usual scenario an amount of resources required for hyperparameter search may approach, equal, or exceed an amount of resources required for model training in the production environment. This need for large resources may create a resource crunch, because using large-scale clusters for hyperparameter search experiments reduces the resources that are available to data scientists for training the models. The scale of the problem and the amount of resources that are required exponentially increase for large-scale deep learning workloads. Hyperparameter search happens, however, in the research and development phase. Training and deploying the models are performance bound, but hyperparameter search is not performance bound. Hence, solving the resource limitation is more important than performance for hyperparameter search. Therefore, it would be advantageous to establish a hyperparameter search/tuning for step 210, for large-scale workloads, that can be performed if computing resources are limited.

Figure 3:
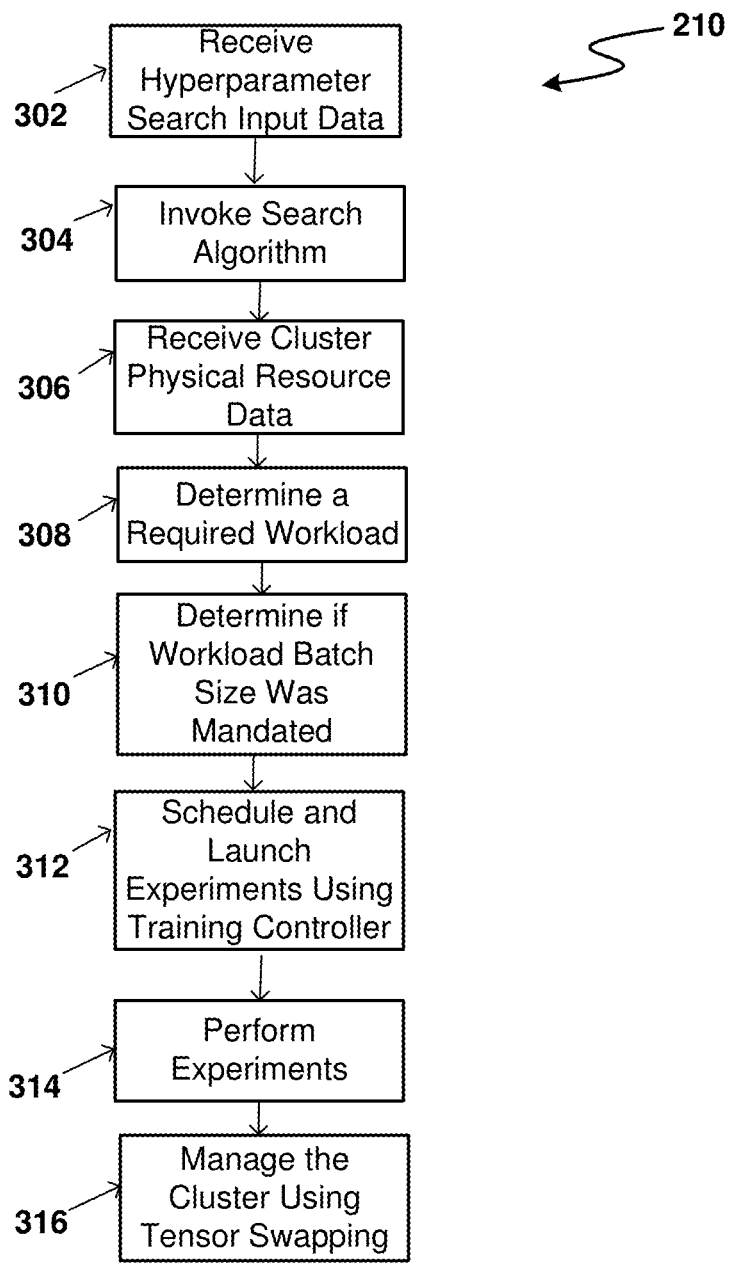
FIG. 3 is an operational flowchart illustrating a process for hyperparameter tuning according to at least one embodiment.

Referring now to FIG. 3, an operational flowchart illustrating the exemplary hyperparameter tuning 210 used by the hyperparameter tuning program 110*a*, 110*b* according to at least one embodiment is depicted. This flowchart shown in FIG. 3 fits into the hyperparameter tuning 210 of the end-to-end deep-learning workflow process 200 that is shown in FIG. 2.

Hyperparameter tuning in deep learning may include choosing a set of optimal hyperparameters for a learning algorithm. This choice may involve a search job within a configuration space defined as per the algorithm. A hyperparameter search job may involve using different search algorithms that will help narrow down the search space. The workload details and the search scope for the hyper parameters may be provided as input to the search algorithm. A search algorithm may generate different sets of hyperparameters for experimentation based on the algorithm used. The experimentation may take place in multiple training runs on the cluster, e.g., on a computing node.

According to at least some embodiments according to the invention, a hyperparameter tuning resource allocator (HTRA) is implemented as an additional module. The HTRA will capture the resource requirements of the search job and simulate the large-scale workload by seamlessly managing the physical and virtual resource usage. Using the workload details and resource requirements, the HTRA automatically manages the computing resources for the requested number of search experiments. The HTRA can manage resources in cases where batch-size scaling is allowed. The HTRA also can manage resources in cases where batch-size scaling is not allowed. When batch-size scaling is not allowed, the same batch size is required to be used for each search experiment.

In a step 302 of hyperparameter tuning 210, hyperparameter search input data is received as part of a hyperparameter search job. The hyperparameter search input data may include workload details, a search scope, the resources required for the tuning (e.g., a number of accelerators that would be required to perform the tuning experiments), a number of parallel experiments for the tuning, an option to mandate a workload batch size for the hyperparameter search, and, if mandated, the workload batch size. The hyperparameter search input data may include which hyperparameters are to be used. For example, momentum and weight decay may be chosen as hyperparameters to be tuned. The workload batch size may also be considered a hyperparameter. The hyperparameter search information may be obtained via a graphical user interface (GUI) which prompts a user to enter in the hyperparameter search input data.

For those embodiments involving deep-learning for image classification, the batch size may be the number of images which may be processed in a single batch. For example, in a data set of one thousand images, it may be possible to process ten images at a time. Therefore, the batch size for that example would be ten. If only one image could be processed at a time, then the batch size is one. If the batch size is larger, then the processing may work through the entire data set more quickly if sufficient computing resources are available. However, greater computing resources are usually required to handle a larger batch size and are often not available.

In a step 304, the hyperparameter search job invokes a search algorithm that generates a set of hyperparameters for experimentation, based on the number of parallel experiments requested. For example, the search algorithm Hyperband, a random search algorithm, a grid search algorithm, a Bayesian optimization algorithm, a gradient-based optimization algorithm, an evolutionary optimization algorithm, a population-based algorithm, a radial basis function algorithm, and/or a spectral algorithm may be used in step 304 to generate a set of hyperparameters for experimentation. The hyperparameters, e.g., momentum and weight decay and batch size, obtained in step 302 may be fed into the search algorithm and the search algorithm may generate test numbers or test values for these hyperparameters that will be tested and tuned in subsequent steps. A deep-learning model may have many hyperparameters, e.g., fifteen to twenty hyperparameters, chosen for which values will be generated and which will be tuned and then used in the deep-learning model once the model is trained.

In a step 306, the HTRA receives physical resource data regarding the cluster, e.g., the computing node, that is available to run the data to perform the experiments. The physical resource data may include the number of accelerators in the cluster. The accelerators could, for example, be graphics processing units (GPUs), field programmable gate arrays (FPGAs), application specific integrated circuits (ASICs), or other accelerators. The physical resource data may also include the amount of memory in an accelerator, e.g., a memory (GPU memory) held by each graphics processing unit. The physical resource data may also include the number of central processing units (CPUs) in the cluster and the amount of memory (CPU memory) held by the CPU or held by each CPU. The physical resource data may also include an amount of system memory that is accessible by the CPU or accessible by each CPU. Knowing or having the physical resource data that is available in a cluster will assist the HTRA to determine how much scaling will be necessary and how the scaling should be apportioned in the GPUs.

In a step 308, the HTRA determines or captures the resource requirements of the search job and determines a required workload to perform the hyperparameter search and tuning. These resource requirements of the search job may be in the hyperparameter search input data that is received in step 302. The HTRA may perform one or more calculations to determine the required workload that would be used to perform the hyperparameter search and tuning.

In a step 310, the HTRA determines if the workload batch size was mandated or not. The HTRA may use the hyperparameter search input data that is received in step 302 to make this determination in step 310. The hyperparameter search input data received in step 302 may include a binary variable indicating affirmatively or negatively whether the workload batch size was mandated. When the workload batch size was mandated, then the hyperparameter search input data would also include the workload batch size provided as a variable. For example, the hyperparameter search input data may include a mandate for a workload batch size of one (1).

In a step 312, the HTRA uses a training controller to schedule the experiments on a cluster and to launch the experiments on the cluster. The training controller has the knowledge of the runtime resources and is configured to schedule the jobs on the available resources. The training controller may be software configured to be compatible with a particular computing cluster.

In a step 314, the experiments are performed on the cluster. A single training experiment or multiple training experiments may be performed on a computing node of the cluster. Data including hyperparameters may be broken into smaller groups and loaded into the cores of accelerators in the cluster for computation with a possible hyperparameter value set. The cluster uses tensor swapping to perform the experiments. For example, the cluster uses tensor swapping to manage the memory requirements. Thousands of tests may be performed with various hyperparameters to identify the best hyperparameter values. A specific hyperparameter group may be tested in the computing cluster, and inference time and accuracy may be observed. Various hyperparameter groups may be tested via experiments in the cluster until the best or most efficient set of hyperparameter values is determined. The efficient set then may be used for a model training step 212 as shown in FIG. 2 and for a recognizing step 214 as shown in FIG. 2. The recognizing step 214 may occur in deep learning when information, e.g., an image or audio signal, is fed to the deep-learning model, and the deep-learning model submits output analysing the image or audio signal.

In a step 316, the HTRA manages the cluster. The HTRA simulates the large-scale workload by managing the physical and virtual resource usage of the cluster. The cluster uses tensor swapping to manage memory requirements when performing the experiments, and the HTRA manages the tensor swapping. During or upon completion of a set of experiments, the cluster may provide training output or metrics back to the training controller and/or to the HTRA so that the next set of experiments may be determined, launched, and/or controlled. The HTRA may use the training controller to launch the next set of experiments on the cluster.

Using the inputs provided, the HTRA automatically manages the resources for the requested number of experiments.

FIG. 4 shows an example of a hyperparameter tuning program 110a, 110b and its interaction with a cluster 408 to perform hyperparameter tuning experiments on the cluster 408. The cluster 408 is a computing cluster that may include an accelerator, as is described below with respect to FIGS. 5 and 6. The hyperparameter tuning program 110a, 110b may include sub-components such as a hyperparameter job input generator, a search algorithm 402, a hyperparameter tuning resource allocator (HTRA) 404, and a training controller 406.

The hyperparameter job input generator may use a graphical user interface (HI GUI) 400 to obtain input about the hyperparameter job search to be performed, i.e., to perform step 302. The HI GUI 400 may prompt and ask a developer or researcher to enter in hyperparameter job search input data such as workload details, a search scope, the resources required for the tuning (e.g., a number of accelerators that are required), a number of parallel experiments, an option to mandate a workload batch size for the hyperparameter search, and, if selected, the workload batch size. The particular hyperparameters to be tested may be entered by the user into the HI GUI 400.

The receiving of the hyperparameter search input data by the HI GUI 400 may cause the search algorithm 402 to be invoked so that step 304 may be performed, namely so that a set of hyperparameters, i.e., a set of hyperparameter values, may be generated based at least in part on the number of parallel experiments requested as part of the hyperparameter job search in the hyperparameter job search input data. Various examples of the search algorithm 402 are mentioned above.

The HTRA 404 performs step 306 by receiving physical resource data regarding a cluster 408 that may be used to perform experiments for the hyperparameter tuning. The HTRA 404 may have a data connection to the cluster 408, e.g., a physical or wireless connection to the cluster 408 to receive the physical resource data. The HTRA 404 also may perform step 308 to determine a required workload. This HTRA 404 may use the hyperparameter search input data received in step 302 in order to determine the required workload in step 308. This HTRA 404 may also use the hyperparameter search input data received in step 302 in order to determine in step 310 whether a workload batch size was mandated. The HTRA also uses the training controller 406 to schedule experiments on the cluster 408 and to launch those experiments on the cluster 408. During or after the experiments are performed on the cluster 408, the cluster may provide training output/metrics back to the HTRA 404 and/or to the training controller 406 so that further experiments in the hyperparameter tuning may be determined and controlled.

FIG. 5 shows an example of a cluster 408 that includes a computing node 500 which may help perform the experiments in at least some embodiments of the method according to the invention. The computing node 500 may include a system memory 502, a central processing unit (CPU) 504, and multiple accelerators. In this exemplary embodiment, the multiple accelerators are graphics processing units (GPUs). A first GPU 506a and a second GPU 506b are shown in FIG. 5, although a computing node may in some embodiments include three, four, five, six, or eight GPUs. The first GPU 506a and the second GPU 506b may be general processing graphics processing units (GPGPUs). The first GPU 506a and the second GPU 506b may be NVIDIA® Tesla® V100 Tensor Core GPUs. (NVIDIA and Tesla and all NVIDIA-based trademarks and logos are trademarks or registered trademarks of Nvidia Corporation.) In other embodiments, another accelerator may be provided in place of the GPUs.

A high-speed memory bus 508 may connect the CPU 504 to the system memory 502. The high-speed memory bus 508 may pass information at a rate of 170 GB/s or higher. A mesh multi-directional interface 510*c* may connect the first and the second GPUs 506*a,b* to each other. A mesh multi-directional interface 510*a* may connect the first GPU 506*a* to the CPU 504, and a mesh multi-directional interface 510*b* may connect the second GPU 506*b* to the CPU 504. This computing node 500 may allow tensor swapping to occur so that the system and method may scale above the usual computing capacity. The mesh multi-directional interfaces 510*a-c* may be ingrained into the silicon of the processor.

For tensor swapping, tensors generated during computations of the experiments in the GPUs may be temporarily passed or transferred from the accelerators, e.g., from the GPUs, e.g., the first GPU 506*a* and the second GPU 506*b*, to the CPU 504 and to the system memory 502 by the CPU 504, so that the accelerators do not become overloaded with data and freeze. With tensor swapping, the resources of the accelerators can be used to perform additional computations and experiments and thereby generate a new tensor or new tensors. After the experiments are complete or while some of the experiments are still in progress, the tensors stored temporarily in the CPU 504 and/or in the system memory 502 may be passed or transferred and backloaded back into the accelerators, e.g., back into the first and the second GPUs 506*a,b*, and back into the hyperparameters that are searched in the accelerators as is required for the training job running on the accelerators.

The mesh multi-directional interfaces 510*a-c* may be bidirectional interfaces which may include eight differential pairs in each direction for a total of thirty-two wires. The pairs may be DC coupled and may use an 85Ω differential termination with an embedded clock. To ease routing, the mesh multi-directional interfaces 510*a-c* may support lane reversal and lane polarity, meaning the physical lane ordering and their polarity between the two devices may be reversed. The mesh multi-directional interfaces 510*a-c* may be a NVLink® 1.0 or a NVLink® 2.0 connection, respectively. (NVLink is a registered trademark of Nvidia Corporation.) The mesh multi-directional interfaces 510*a-c* may each include four NVLink® connections. In some embodiments, a cluster 408 may include four accelerators, e.g., four GPUs, and two CPUs, with the four accelerators being fully connected to each other with a fourth link going to one of the two CPUs. In some embodiments, an accelerator and the CPU 504 may access the memory of each other, e.g., for direct load and stores, in a flat address space. The flat address space may be supported through new address translation services. Additionally, in some embodiments the CPU 504 and an accelerator may have native support for atomic operations. The flat address space may enable cache coherence and allow the CPU 504 to efficiently cache memory of an accelerator, thereby significantly improving latencies and thus performance. In a cluster with eight accelerators on a single baseboard, a switch may be provided that connects every one of the eight accelerators to all the other seven accelerators on the same baseboard. For example, the cluster may include eight GPUs with the described connective features.

In cases where batch-size scaling is possible, in response to the HTRA 404 determining same, the HTRA 404 simulates a large-scale workload by dynamically scaling the batch size depending on the workload batch requirement. If the option to mandate workload batch size for hyperparameter search is not selected, then batch-size scaling is possible. The HTRA 404 simulates a large-scale workload by dynamically scaling the batch size depending on the workload batch size that is provided and depending on the resource requirement.

As a part of this dynamic scaling, the HTRA 404 identifies the cumulative batch size required for the search experiment. The cumulative batch size is the workload batch size multiplied by the number of accelerators that is required. The HTRA 404 has from step 306 the details of the number of physical accelerators in the cluster 408 and the CPU memory and accelerator memory available. The HTRA 404 also has the number of experiments requested. The cumulative batch size is divided among the available physical accelerators in the cluster 408 for the required number of experiments.

Therefore, in this embodiment with no batch size mandate and with dynamic scaling, each physical accelerator would have to handle a higher batch size. The memory and communication requirements arising from the scaling of batch size is handled by the HTRA 404 seamlessly using tensor swapping between the accelerators (e.g., any GPU such as the first GPU 506*a* and the second GPU 506*b*) and the CPU 504. The batch-size scaling mechanism of the HTRA 404 may be based on the cumulative accelerator memory and CPU memory available.

For cases where batch-size scaling cannot be used, e.g., for cases when a workload batch size is mandated in the hyperparameter search input data, the HTRA 404 determines same and then in response may manage resources by creating and managing virtual accelerators that can emulate the physical accelerators. In this manner, a large-scale simulation of a large-scale workload may be performed. The mandated workload batch size would be used for hyperparameter search. For example, the hyperparameter search input data from step 302 may include a mandate for the workload batch size to be one (1).

For this embodiment with a workload batch size mandate, the HTRA 404 initially allocates virtual accelerators depending on the number of accelerators required for the total number of parallel experiments requested for hyperparameter search. The allocation also considers the physical accelerators available, the accelerator memory, and the CPU memory available for each computing node in the cluster 408. The creation of virtual accelerators depends on the cumulative accelerator memory and CPU memory available.

Certain Search algorithms, like Hyperband, use techniques like successive halving in which the number of parallel experiments is reduced at each step of hyperparameter search. The reduction occurs by selecting the high potential configurations and discarding others. In such cases, the HTRA 404 will reallocate virtual accelerators as required for each step to take advantage of the extra resources available. Reallocation is done such that more resources, e.g., memory and floating point operations per second (flops), are available to the remaining virtual accelerators required at the further step. This reallocation implicitly makes the experiment run faster for that step. The communication pattern may also be altered according to the reallocation.

This use of virtual accelerators, e.g., virtual GPUs, may ensure that available accelerator resources are efficiently allocated and may maximize the physical resource utilization of the cluster 408 by dynamically adjusting the resources as per the hyperparameter search job requirement.

The HTRA 404 may manage the virtual accelerator creation and the memory requirements of virtual accelerators by using tensor swapping between a number of accelerators and the CPU 504.

An example where an HTRA 404 allocates virtual accelerators within a physical accelerator is depicted in FIG. 6. FIG. 6 shows how the HTRA 404 operates for cases when a workload batch size is mandated in the hyperparameter search input data. FIG. 6 shows a computing node 600 in which the CPU 504 has CPU memory 620 and in which virtual GPUs 612*a-i* are created in the first and second GPUs 506*a,b* that are shown. The virtual GPUs 612*a-i* may access the CPU memory 620 for tensor swapping. A particular virtual GPU, e.g., virtual GPU 612*a*, may consistently access the same address space within the CPU memory 620 or the same address space within the system memory 502 for the tensor swapping. FIG. 6 also shows inter GPU and intra GPU communication patterns.

A hyperparameter training that occurs without the methods and without the systems described herein occurs without a hyperparameter tuning resource allocator and without the ability to scale up with limited computing resources. In this example without the scale-up ability and where the cluster has eight GPUs, a hyperparameter search job for a workload that needs eight GPUs with a batch size of one (1) can only perform one training experiment. This tuning is limited by the physical resources available.

That example stands in contrast to the examples for the system and method for hyperparameter search/tuning for a large-scale deep-learning workload with limited resources as described herein. In the invention described herein, a hyperparameter tuning resource allocator, e.g., HTRA 404, is used. In this example, even though the cluster 408 has only eight GPUs, the hyperparameter search job is enabled to run eight experiments in parallel with a batch size of one. This operation would usually need sixty-four (64) GPUs to be ran in the usual scenario, with eight (8) GPUs being used for each experiment. The HTRA 404 can simulate the large-scale workload using limited resources. Based on whether the option to use the workload batch size for hyperparameter search is selected or not, the HTRA 404 can take one of two approaches to seamlessly perform the simulation of large-scale workload.

If the option to mandate the workload batch size is not selected, then the HTRA 404 may use the batch-size scaling mechanism and may manage the floating point operation per second (flops) and memory requirement for physical accelerators seamlessly.

In the given example with no workload batch size mandate and where the workload requirement is to run eight experiments in parallel, each experiment may be run on one physical accelerator by seamlessly scaling to a batch size of eight experiments per accelerator, e.g., a batch size of eight experiments per GPU. This dynamic scaling allows eight experiments to be run in parallel even with limited resources. The system and method allow the operation to be performed with just eight accelerators, when originally the tuning operation needed sixty-four accelerators.

Additionally, if a search algorithm like Hyperband is used which may reduce the number of experiments by half in successive steps, then the HTRA 404 may reallocate resources after each run. In this example with an experiment reduction in half for a successive step, the next step with four experiments in parallel may have each of the eight accelerators using a batch size of four. This reallocation speeds up the runs and maximizes resource utilization.

If the option to mandate the workload batch size is selected and if a batch size of one (1) is mandated, then the HTRA 404 may create virtual accelerators to handle the resource requirements. FIG. 6 shows a cluster 408 that includes a computing node 600 in which virtual GPUs 612*a-i* have been created by the HTRA 404. FIG. 6 shows that the computing node 600 has many common components with the computing node 500 showed in FIG. 5, so that some common reference numerals are used in both FIG. 5 and in FIG. 6.

In the given example for when the workload batch size is mandated, the HTRA 404 may create sixty-four virtual accelerators, e.g., sixty-four GPUs, with eight virtual GPUs in each physical GPU, and with each virtual GPU handling a batch size of one. This creation of the virtual accelerators, e.g., the virtual GPUs 612*a-i*, allows eight experiments to be run in parallel even with limited resources. The tuning operation originally needed sixty-four physical accelerators, but now can be performed with eight physical accelerators. All the memory, floating point operations per second (flops), and communication requirements for the virtual GPUs 612*a-i* would be handled seamlessly by the HTRA 404. Virtual GPUs 612*a-i* and memory 620 of the CPU 504 are shown in FIG. 6.

Additionally in this alternative, if a search algorithm like Hyperband is used where the number of experiments is reduced by half in successive steps, then the HTRA 404 will reallocate virtual accelerators utilizing all the available resources. In this example, the next step with four experiments in parallel will have thirty-two virtual accelerators created, where each virtual accelerator handles a batch size of one according to the mandate.

The HTRA 404 may manage intra accelerator communication, i.e., communication between virtual accelerators within a particular physical accelerator. For example, the HTRA 404 may manage intra GPU communication 614*a* between virtual GPU 612*a* and virtual GPU 612*b* in the first GPU 506*a* (the first GPU 506*a* is a physical GPU), intra GPU communication 614*b* between virtual GPU 612*d* and virtual GPU 612*e* in the first GPU 506*a*, intra GPU communication 614*c* between virtual GPU 612*f* and virtual GPU 612*g* in the second GPU 506*b* (the second GPU 506*b* is a physical GPU), and intra GPU communication 614*d* between virtual GPU 612*h* and virtual GPU 612*i* in the second GPU 506*b*. The HTRA 404 also may manage inter accelerator communication. For example, the HTRA 404 may manage inter GPU communication 616 which occurs between a virtual GPU of one physical GPU and a virtual GPU of another physical GPU. This inter GPU communication 616 may occur between virtual GPU 612*c* of the first GPU 506*a* and a virtual GPU 612*f* of the second GPU 506*b*. The inter GPU communication 616 may occur via a mesh multi-directional interface such as the mesh multi-directional interface 510*c* shown in FIG. 5. The HTRA 404 may manage communication between the virtual accelerators such as virtual GPUs 612*a-i* using communication technologies like NCCL (NVIDIA® Collective Communications Library) or MPI (message passing interface).

If the option to mandate the workload batch size is not selected, then depending on the size of the problem to be solved, the HTRA 404 could still create virtual accelerators to manage the experiments similar as described for the embodiment where the option to mandate the workload batch size is selected.

It may be appreciated that FIGS. 2-6 provide only illustrations of certain embodiments and do not imply any limitations with regard to how different embodiments may be implemented. Many modifications to the depicted embodiment(s) may be made based on design and implementation requirements.

As described in embodiments above, the hyperparameter tuning program 110*a*, 110*b* may improve the functionality of a computer by allowing limited computing resources to be scaled up to perform hyperparameter tuning for large-scale workloads.

Figure 7:
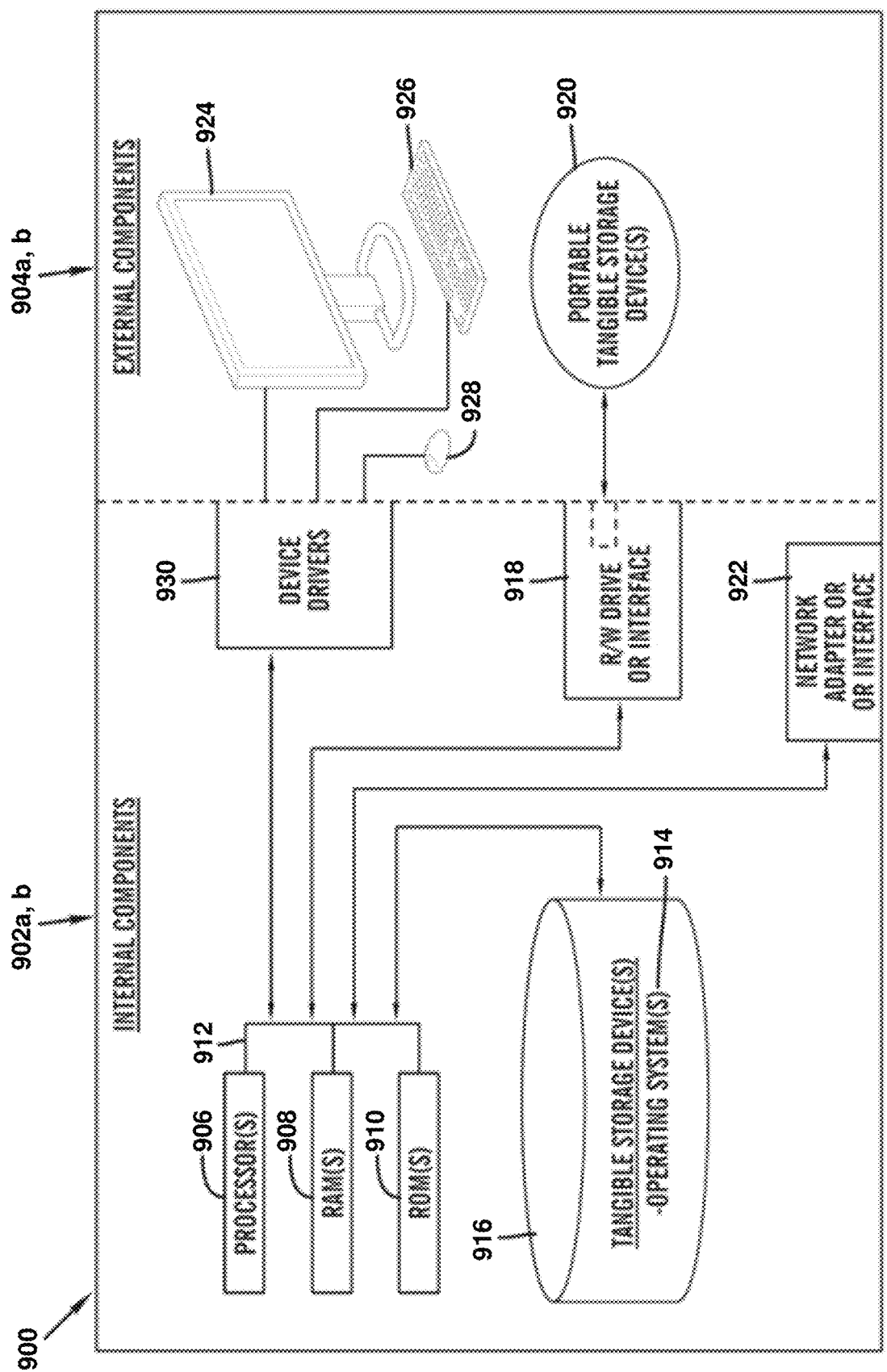
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the hyperparameter tuning program 110a in client computer 102, and the hyperparameter tuning program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the hyperparameter tuning program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the hyperparameter tuning program 110a in client computer 102 and the hyperparameter tuning program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the hyperparameter tuning program 110a in client computer 102 and the hyperparameter tuning program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
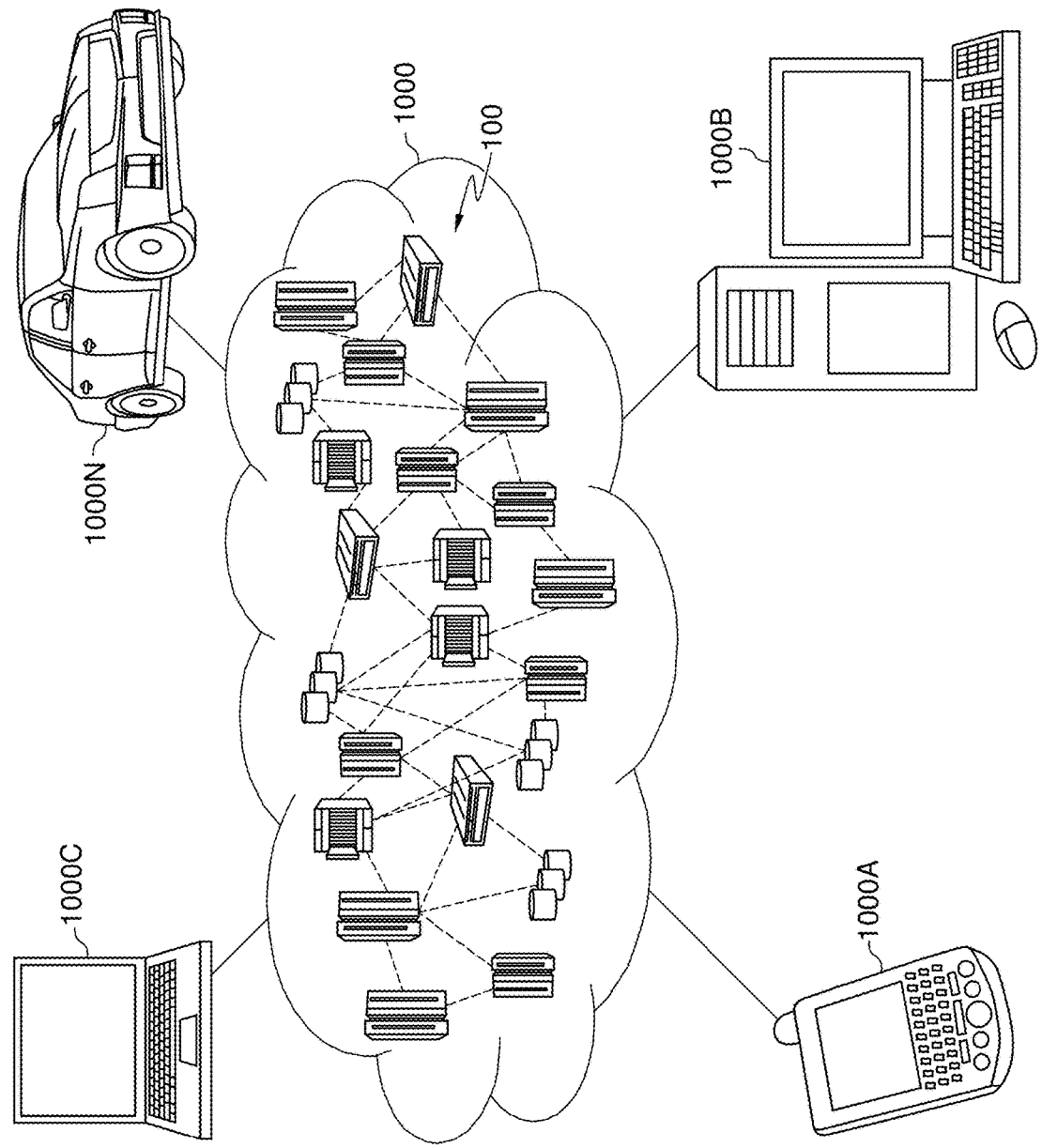
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
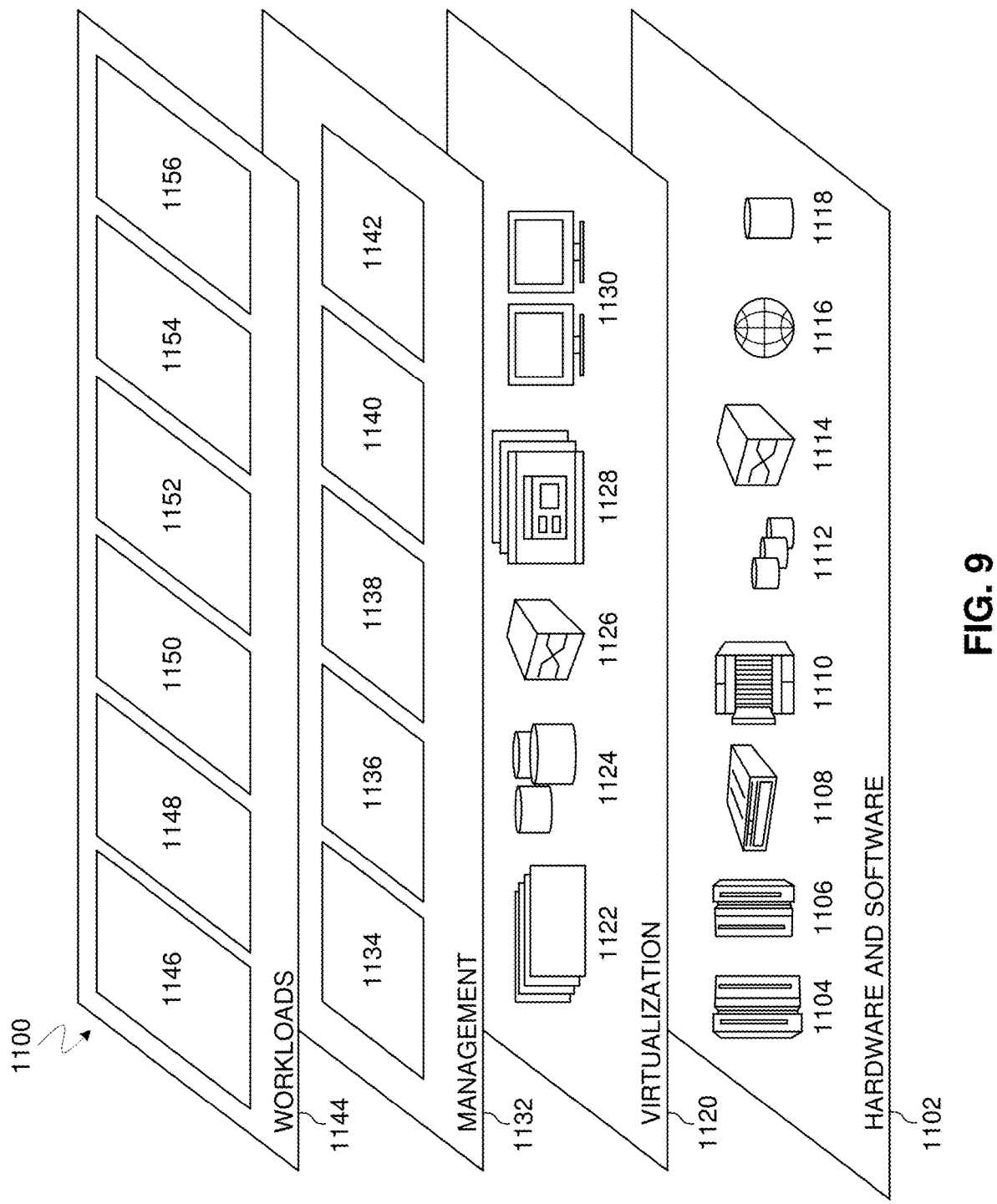
FIG. 9 is a block diagram of functional layers of the illustrative cloud computing environment of FIG. 7, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and hyperparameter tuning 1156. A hyperparameter tuning program 110a, 110b provides a way to scale resources and perform hyperparameter training for large-scale workloads using limited computing resources.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by one or more processors, the method comprising:
    receiving hyperparameter search input data indicating a number of parallel experiments to be run;
    invoking a search algorithm to generate a set of hyperparameters;
    receiving, at a hyperparameter tuning resource allocator, physical resource data regarding a cluster, wherein the cluster comprises at least one accelerator and at least one central processing unit, the at least one accelerator comprises an accelerator memory, and the at least one central processing unit comprises a CPU memory;
    determining, via the hyperparameter tuning resource allocator, a required workload based on the received number of parallel experiments;
    determining, via the hyperparameter tuning resource allocator and by analyzing the hyperparameter search input data, whether a workload batch size for the parallel experiments was mandated;
    performing, via the cluster, the number of parallel experiments to search the set of hyperparameters and to tune the set of hyperparameters, wherein the hyperparameter tuning resource allocator manages the cluster, during the performing, according to the physical resource data and the required workload and by using tensor swapping; and
    creating and managing, via the hyperparameter tuning resource allocator, virtual accelerators within the at least one accelerator for performing the number of parallel experiments, wherein for the tensor swapping a respective virtual accelerator of the virtual accelerators consistently accesses the same respective address space in the CPU memory.

2. The method of claim 1, wherein the hyperparameter tuning resource allocator creates and manages the virtual accelerators within the at least one accelerator in response to determining that the workload batch size was mandated.

3. The method of claim 1, wherein the hyperparameter tuning resource allocator uses a training controller to launch the performing of the number of parallel experiments on the cluster.

4. The method of claim 1, wherein the hyperparameter tuning resource allocator manages floating point operations per second of the at least one accelerator.

5. The method of claim 1, wherein in response to determining that the workload batch size was not mandated, the hyperparameter tuning resource allocator dynamically scales a batch size of the parallel experiments based on the required workload.

6. The method of claim 1, wherein the tensor swapping comprises transferring at least one tensor from the at least one accelerator to the at least one central processing unit and comprises the at least one central processing unit returning the at least one tensor to the at least one accelerator; and
    wherein the at least one tensor is generated via the at least one accelerator.

7. The method of claim 1, wherein for the tensor swapping the at least one accelerator accesses the CPU memory and the at least one central processing unit accesses the accelerator memory via a flat address space that enables cache coherence.

8. The method of claim 1, wherein the at least one accelerator comprises a first accelerator, the virtual accelerators are within the first accelerator, and the hyperparameter tuning resource allocator manages intra accelerator communication between the virtual accelerators within the first accelerator.

9. A computer system for hyperparameter tuning, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving hyperparameter search input data indicating a number of parallel experiments to be run;
    invoking a search algorithm to generate a set of hyperparameters;
    receiving, at a hyperparameter tuning resource allocator, physical resource data regarding a cluster, wherein the cluster comprises at least one accelerator and at least one central processing unit, the at least one accelerator comprises an accelerator memory, and the at least one central processing unit comprises a CPU memory;
    determining, via the hyperparameter tuning resource allocator, a required workload based on the received number of parallel experiments to be run;
    determining, via the hyperparameter tuning resource allocator and by analyzing the hyperparameter search input data, whether a workload batch size for the parallel experiments was mandated;
    performing, via the cluster, the number of parallel experiments to search the set of hyperparameters and to tune the set of hyperparameters, wherein the hyperparameter tuning resource allocator manages the cluster, during the performing, according to the physical resource data and the required workload and by using tensor swapping; and
    creating and managing, via the hyperparameter tuning resource allocator, virtual accelerators within the at least one accelerator for performing the number of parallel experiments, wherein for the tensor swapping a respective virtual accelerator of the virtual accelerators consistently accesses the same respective address space in the CPU memory.

10. The computer system of claim 9, wherein the hyperparameter tuning resource allocator creates and manages the virtual accelerators within the at least one accelerator in response to determining that the workload batch size was mandated.

11. The computer system of claim 9, wherein the hyperparameter tuning resource allocator uses a training controller to launch the performing of the number of parallel experiments on the cluster.

12. The computer system of claim 9, wherein the hyperparameter tuning resource allocator manages floating point operations per second of the at least one accelerator.

13. The computer system of claim 9, wherein in response to determining that the workload batch size was not mandated, the hyperparameter tuning resource allocator dynamically scales a batch size of the parallel experiments depending on the required workload.

14. The computer system of claim 9, wherein the tensor swapping comprises transferring at least one tensor from the at least one accelerator to the at least one central processing unit and comprises the at least one central processing unit returning the at least one tensor to the at least one accelerator; and wherein the at least one tensor is generated via the at least one accelerator.

15. A computer program product for hyperparameter tuning, comprising a computer-readable storage medium having program instructions embodied therewith, the program instructions being executable by a processor to cause the processor to perform a method comprising:

receiving hyperparameter search input data indicating a number of parallel experiments to be run;

invoking a search algorithm to generate a set of hyperparameters;

receiving, at a hyperparameter tuning resource allocator, physical resource data regarding a cluster, wherein the cluster comprises at least one accelerator and at least one central processing unit, the at least one accelerator comprises an accelerator memory, and the at least one central processing unit comprises a CPU memory;

determining, via the hyperparameter tuning resource allocator, a required workload based on the received number of parallel experiments to be run;

determining, via the hyperparameter tuning resource allocator and by analyzing the hyperparameter search data, whether a workload batch size for the parallel experiments was mandated;

performing, via the cluster, the number of parallel experiments to search the set of hyperparameters and to tune the set of hyperparameters, wherein the hyperparameter tuning resource allocator manages the cluster, during the performing, according to the physical resource data and the required workload and by using tensor swapping; and creating and managing, via the hyperparameter tuning resource allocator, virtual accelerators within the at least one accelerator for performing the number of parallel experiments, wherein for the tensor swapping a respective virtual accelerator of the virtual accelerators consistently accesses the same respective address space in the CPU memory.

16. The computer program product of claim 15, wherein the hyperparameter tuning resource allocator creates and manages the virtual accelerators within the at least one accelerator in response to determining that the workload batch size was mandated.

17. The computer program product of claim 15, wherein the hyperparameter tuning resource allocator uses a training controller to launch the performing of the number of parallel experiments on the cluster.

18. The computer program product of claim 15, wherein the hyperparameter tuning resource allocator manages floating point operations per second of the at least one accelerator.

19. The computer program product of claim 15, wherein in response to determining that the workload batch size was not mandated, the hyperparameter tuning resource allocator dynamically scales a batch size of the parallel experiments depending on the required workload.

20. The computer program product of claim 15, wherein for the tensor swapping the at least one accelerator accesses the CPU memory and the at least one central processing unit accesses the accelerator memory via a flat address space that enables cache coherence.

* * * * *